US012646161B2

(12) United States Patent
Kim et al.

(10) Patent No.: US 12,646,161 B2
(45) Date of Patent: Jun. 2, 2026

(54) WELDING CONDITION DIAGNOSIS APPARATUS AND SYSTEM BASED ON 3D SCANNING DATA

(71) Applicant: Korea Photonics Technology Institute, Gwangju (KR)

(72) Inventors: Hoe Min Kim, Gwangju (KR); Sung Kuk Chun, Gwangju (KR); Seon Man Kim, Gwangju (KR); Kwang Hoon Lee, Gwangju (KR); Jeong Rok Yun, Gwangju (KR); Un Yong Kim, Gwangju (KR)

(73) Assignee: Korea Photonics Technology Institute, Gwangju (KR)

( * ) Notice: Subject to any disclaimer, the term of this patent is extended or adjusted under 35 U.S.C. 154(b) by 354 days.

(21) Appl. No.: 18/495,880

(22) Filed: Oct. 27, 2023

(65) Prior Publication Data

US 2024/0144462 A1 May 2, 2024

(30) Foreign Application Priority Data

Nov. 2, 2022 (KR) ........................ 10-2022-0144225

(51) Int. Cl.
| | |
|---|---|
| *G06T 7/00* | (2017.01) |
| *G06T 7/11* | (2017.01) |
| *G06V 20/64* | (2022.01) |

(52) U.S. Cl.
CPC .............. *G06T 7/0004* (2013.01); *G06T 7/11* (2017.01); *G06V 20/64* (2022.01); *G06T 2200/04* (2013.01); *G06T 2207/10028* (2013.01)

(58) Field of Classification Search
CPC ..... G06T 7/0004; G06T 7/11; G06T 2200/04; G06T 2207/10028; G06T 7/0008;
(Continued)

(56) References Cited

U.S. PATENT DOCUMENTS

| | | | | |
|---|---|---|---|---|
| 2012/0048838 A1* | 3/2012 | Ishida | .................. | B23K 26/244 |
| | | | | 219/121.83 |
| 2020/0316703 A1* | 10/2020 | Matsuoka | .............. | B23K 9/095 |

(Continued)

FOREIGN PATENT DOCUMENTS

JP       2016170026 A       9/2016

OTHER PUBLICATIONS

Feasibility Study of a Structured Light System Applied to Welding Inspection Based on Articulated Coordinate Measure Machine Data, Manuel Rodriguez-Martin et al. IEEE Sensors Journal, vol. 17, No. 13, Jul. 1, 2017.

(Continued)

*Primary Examiner* — Van D Hynh

(74) *Attorney, Agent, or Firm* — Dinsmore & Shohl LLP; Yongsok Choi, Esq.

(57) ABSTRACT

Disclosed are an apparatus and system for evaluating a welding condition on the basis of three-dimensional data. An aspect of the present embodiment provides an apparatus for evaluating a welding condition, the apparatus including a communication unit configured to receive a three-dimensional image for an evaluation target from the outside, a base material recognition unit configured to recognize a base material from the three-dimensional image for the evaluation target by using a point cloud, a bead extraction unit configured to extract a welding bead welded between the base materials, a bead cross-section acquisition unit configured to acquire cross-sections at preset intervals for the extracted welding bead, and a profile analysis unit configured to analyze a profile of the welding bead for the cross-section acquired by the bead cross-section acquisition unit.

9 Claims, 6 Drawing Sheets

130

(58) Field of Classification Search
CPC . G06T 7/70; G06T 2207/30152; G06V 20/64;
B23K 31/125
See application file for complete search history.

(56) References Cited

U.S. PATENT DOCUMENTS

| | | | | |
|---|---|---|---|---|
| 2021/0308782 | A1* | 10/2021 | Sakurai | G06N 3/09 |
| 2021/0316404 | A1* | 10/2021 | Trapp | B23K 31/125 |
| 2023/0139733 | A1* | 5/2023 | Mo | G01N 33/207 |
| | | | | 702/166 |
| 2023/0274407 | A1* | 8/2023 | Kommareddy | B23K 31/125 |
| | | | | 382/141 |
| 2024/0042614 | A1* | 2/2024 | Schwenker | B23K 31/02 |
| 2024/0131608 | A1* | 4/2024 | Huang | B23K 9/04 |
| 2024/0181648 | A1* | 6/2024 | Liang | B25J 11/005 |
| 2024/0261906 | A1* | 8/2024 | Kataoka | B23K 9/23 |

OTHER PUBLICATIONS

Method of extracting the 3D cross section geometry of weld beads, Hoe-Min Kim et al., 2021.

* cited by examiner

WELDING CONDITION DIAGNOSIS APPARATUS AND SYSTEM BASED ON 3D SCANNING DATA

CROSS-REFERENCE TO RELATED APPLICATIONS

This application claims priority to Korean Patent Application No. 10-2022-0144225 filed on Nov. 2, 2022, the entire contents of which are herein incorporated by reference.

This patent is the results of research that was carried out by the support (a unique project number: 1415185743, a detailed project number: 20016155, a project name: Human factor-based manual welding technology field knowledge asset system technology development) of Korea Planning and Evaluation of Industrial Technology by the finances of the government of the Republic of Korea (Ministry of Trade, Industry and Energy) in 2023.

TECHNICAL FIELD

The present disclosure relates to an apparatus and system for evaluating a welding condition on the basis of three-dimensional data of welding beads.

BACKGROUND ART

The contents disclosed in this section only provide background information in respect to the embodiment of the present disclosure but do not constitute the prior art.

When a welding process, such as laser welding, arc welding, or electron beam welding, is performed along a welding line, solidified fused metal is produced on a base material. The fused metal formed in a predetermined band shape along a trajectory on the base material is called a bead.

A welding bead quality inspection using a tailer welded blank (TWB) process in the related art is mostly performed as a visual quality inspection by an operator. For this reason, material bursting occurs frequently in a post-process because of failure to detect a pinhole. In order to solve the above-mentioned problem and improve welding quality, there is an essential need for a device capable of automatically determining welding quality by observing, in real time, shapes of welding beads while the welding process is performed.

A welding bead measurement device in the related art may acquire only fragmentary information on heights and areas of the welding beads only at measurement positions on welded parts by using a manual leg gauge. The manual leg gauge is characterized by being small, portable, easy to use, and inexpensive, but has a problem in that a large number of processes are required to ensure data because of a large amount of measurement time, measurement data need to be recorded one by one by an inspector, and errors may occur in the measurement data depending on the inspector. In addition, the manual leg gauge also has a problem in that a deviation greatly varies depending on an angle of a base material, the manual leg gauge cannot measure a base material that has an acute or obtuse angle without having a right angle, and a size measured by the manual leg gauge is smaller than an actual size.

In order to solve the above-mentioned problems, a three-dimensional vision inspection system for inspecting welding beads by a 2D or 3D camera may acquire digital images of the welding beads and quickly acquire information on the shapes of the welding bead by using the acquired images.

However, the three-dimensional vision inspection system in the related art easily inspects the welding bead only when a volume of the welding bead is at a predetermined level or more and thus the welding bead and the base material are clearly distinguished. In case that welding is performed between base materials intersecting perpendicularly, it is difficult for the system in the related art to clearly distinguish the welding bead and the base materials, which causes a problem in that it is difficult to accurately inspect the welding bead for quality.

SUMMARY OF THE INVENTION

The present disclosure has been made in an effort to provide an apparatus and system for evaluating welding conditions on the basis of three-dimensional data of welding beads produced between base materials intersecting perpendicularly.

An aspect of the present embodiment provides a welding condition evaluation apparatus including: a communication unit configured to receive a three-dimensional image for an evaluation target from the outside; a base material recognition unit configured to recognize a base material from the three-dimensional image for the evaluation target by using a point cloud; a bead extraction unit configured to extract a welding bead welded between the base materials; a bead cross-section acquisition unit configured to acquire cross-sections at preset intervals for the extracted welding bead; and a profile analysis unit configured to analyze a profile of the welding bead for the cross-section acquired by the bead cross-section acquisition unit.

According to the aspect of the present embodiment, the evaluation target may be configured such that any one base material and the other base material are positioned so that surfaces or edges thereof are perpendicularly in contact with each other.

According to the aspect of the present embodiment, the welding bead may have a preset volume based on a straight line with which the two base materials are in contact.

According to the aspect of the present embodiment, the bead extraction unit may extract only the welding bead by removing the base material recognized by the base material recognition unit from the three-dimensional image for the evaluation target.

Another aspect of the present embodiment provides a welding condition evaluation system, which three-dimensionally measures an evaluation target, which has been welded, and evaluates a welding condition of a welding bead by extracting only the welding bead in measured data, the welding condition evaluation system including: a stage configured to support the evaluation target on an upper surface thereof; a scanner configured to sense a three-dimensional image of the evaluation target; and a welding condition evaluation apparatus configured to analyze a profile of the welding bead by extracting only the welding bead on the basis of the three-dimensional image of the evaluation target sensed by the scanner, in which the welding condition evaluation apparatus includes: a communication unit configured to receive a three-dimensional image for an evaluation target from the outside; a base material recognition unit configured to recognize a base material from the three-dimensional image for the evaluation target by using a point cloud; a bead extraction unit configured to extract a welding bead welded between the base materials; a bead cross-section acquisition unit configured to acquire cross-sections at preset intervals for the extracted welding bead; and a profile analysis unit configured to analyze a profile of the welding bead for the cross-section acquired by the bead cross-section acquisition unit.

According to the aspect of the present embodiment, the evaluation target may have a structure in which any one base material and another base material are stacked on each other so that one base material overlaps another base material by a predetermined area, and the evaluation target may include the welding bead formed at ends of the two base materials that are in contact with each other.

According to the aspect of the present embodiment, the evaluation target may have a structure in which edges of any one base material and another base material are perpendicularly in contact with each other, and the evaluation target may include the welding bead formed in a space in which the edges of the two base materials are in contact with each other.

Still another aspect of the present embodiment provides a method of evaluating a welding condition of an evaluation target by using a welding condition evaluation apparatus, the method including: a receiving process of receiving a three-dimensional image for an evaluation target from the outside; a recognition process of recognizing a base material from the three-dimensional image for the evaluation target by using a point cloud; an extraction process of extracting a welding bead welded between the base materials; an acquisition process of acquiring cross-sections at preset intervals for the welding bead extracted in the extraction process; and an analysis process of analyzing a profile of the welding bead for the cross-section acquired in the acquisition process.

Yet another aspect of the present embodiment provides a welding condition evaluation apparatus including: a communication unit configured to receive a three-dimensional image for an evaluation target from the outside; a base material recognition unit configured to recognize a base material from the three-dimensional image for the evaluation target by using a point cloud; a bead extraction unit configured to extract a welding bead welded between the base materials; a bead cross-section acquisition unit configured to acquire cross-sections at preset intervals for the extracted welding bead; a profile analysis unit configured to analyze a profile of the welding bead for the cross-section acquired by the bead cross-section acquisition unit; and a defect determination unit configured to determine a defective part in the welding bead on the basis of the profile analyzed by the profile analysis unit.

According to the aspect of the present embodiment, the defect determination unit may calculate an average value of the profiles of the cross-sections of the welding bead.

According to the aspect of the present embodiment, the defect determination unit may determine whether there is a cross-section having a profile deviating from the calculated average value in a preset error range.

According to the aspect of the present embodiment, the defect determination unit may determine that a section to the cross-section having the profile deviating from the calculated average value in the preset error range and a cross-section adjacent to the corresponding cross-section is a defective part.

Still yet another aspect of the present embodiment provides a welding condition evaluation system, which three-dimensionally measures an evaluation target, which has been welded, and evaluates a welding condition of a welding bead by extracting only the welding bead in measured data, the welding condition evaluation system including: a stage configured to support the evaluation target on an upper surface thereof; a scanner configured to sense a three-dimensional image of the evaluation target; and a welding condition evaluation apparatus configured to analyze a profile of the welding bead by extracting only the welding bead on the basis of the three-dimensional image of the evaluation target sensed by the scanner, in which the welding condition evaluation apparatus includes: a communication unit configured to receive a three-dimensional image for an evaluation target from the outside; a base material recognition unit configured to recognize a base material from the three-dimensional image for the evaluation target by using a point cloud; a bead extraction unit configured to extract a welding bead welded between the base materials; a bead cross-section acquisition unit configured to acquire cross-sections at preset intervals for the extracted welding bead; a profile analysis unit configured to analyze a profile of the welding bead for the cross-section acquired by the bead cross-section acquisition unit; and a defect determination unit configured to determine a defective part in the welding bead on the basis of the profile analyzed by the profile analysis unit.

According to the aspect of the present embodiment, the evaluation target may have a structure in which any one base material and another base material are stacked on each other so that one base material overlaps another base material by a predetermined area, and the evaluation target may include the welding bead formed at ends of the two base materials that are in contact with each other.

According to the aspect of the present embodiment, the evaluation target may have a structure in which edges of any one base material and another base material are perpendicularly in contact with each other, and the evaluation target may include the welding bead formed in a space in which the edges of the two base materials are in contact with each other.

A further aspect of the present embodiment provides a method of evaluating a welding condition of an evaluation target by using a welding condition evaluation apparatus, the method including: a receiving process of receiving a three-dimensional image for an evaluation target from the outside; a recognition process of recognizing a base material from the three-dimensional image for the evaluation target by using a point cloud; an extraction process of extracting a welding bead welded between the base materials; an acquisition process of acquiring cross-sections at preset intervals for the welding bead extracted in the extraction process; an analysis process of analyzing a profile of the welding bead for the cross-section acquired in the acquisition process; and a determination process of determining the presence of and position of a defective part in the bead on the basis of an analysis result made in the analysis process.

According to the exemplary embodiments of the present disclosure described above, it is possible to accurately evaluate the welding conditions on the basis of the three-dimensional data for the welding bead welded between the base materials intersecting perpendicularly.

BRIEF DESCRIPTION OF THE DRAWINGS

FIG. 6 is a view illustrating a process of analyzing a profile of a cross-sectional shape of a base material by using the welding condition evaluation apparatus according to the embodiment of the present disclosure.

DETAILED DESCRIPTION

Figure 1:
FIG. 1 is a view illustrating a configuration of a welding condition evaluation system according to an embodiment of the present disclosure.
Figure 1:
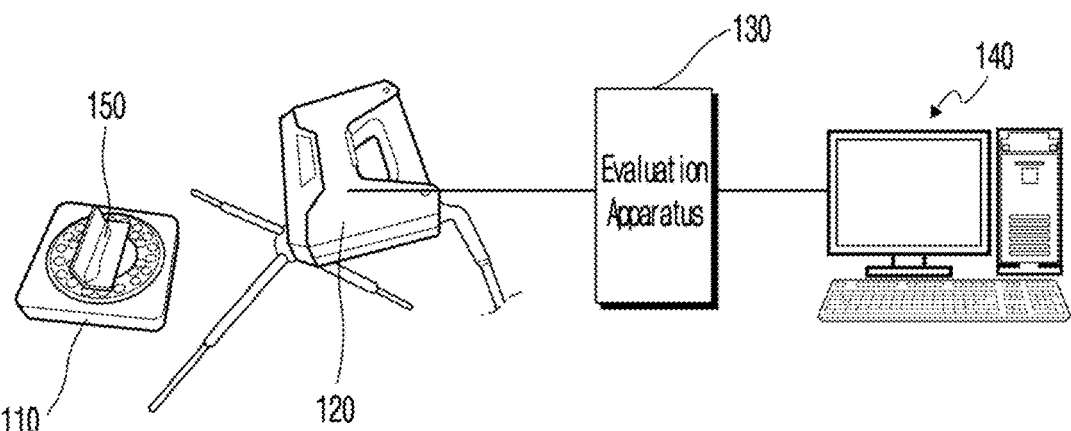

Hereinafter, exemplary embodiments of the present disclosure will be described in detail with reference to the accompanying drawings so that those with ordinary skill in the art to which the present disclosure pertains may easily carry out the exemplary embodiments. However, the present disclosure may be implemented in various different ways and is not limited to the embodiments described herein. Further, a part irrelevant to the description will be omitted in the drawings in order to clearly describe the present disclosure, and similar constituent elements will be designated by similar reference numerals throughout the specification.

Throughout the specification, when one constituent element is referred to as being "connected to" another constituent element, one constituent element can be "directly connected to" the other constituent element, and one constituent element can also be "electrically connected to" the other element with other elements therebetween. In addition, unless explicitly described to the contrary, the word "comprise/include" and variations such as "comprises/includes" or "comprising/including" will be understood to imply the inclusion of stated elements, not the exclusion of any other elements. However, the word does not preclude the presence or addition of one or more other features, integers, steps, operations, elements, components, and/or combinations thereof.

The following embodiments will be described to assist in understanding the present disclosure and are not intended to limit the protection scope of the present disclosure. Therefore, the inventions, which perform the same function and belong to the same scope as the present disclosure, also belong to the protection scope of the present disclosure.

In addition, the configurations, processes, procedures, or methods included in each embodiment of the present disclosure may be shared within a range in which they do not technically contradict one another.

FIG. 1 is a view illustrating a configuration of a welding condition evaluation system according to an embodiment of the present disclosure, and FIGS. 3A-3D are views illustrating examples of base materials according to the embodiment of the present disclosure.

With reference to FIG. 1, a welding condition evaluation system 100 according to an embodiment of the present disclosure includes a stage 110, a scanner 120, and a welding condition evaluation apparatus 130 (hereinafter, referred to as an 'evaluation apparatus'). Further, the welding condition evaluation system 100 may further include a monitoring device 140.

The welding condition evaluation system 100 (hereinafter, referred to as an 'evaluation system') three-dimensionally measures a base material, which has been welded, extracts only a welding bead in the measurement data, and evaluates a welding condition of the welding bead. The evaluation system 100 may smoothly separate only the welding bead from an evaluation target 150 having a structure illustrated in FIGS. 3A-3D and evaluate the welding condition.

Figure 3A:
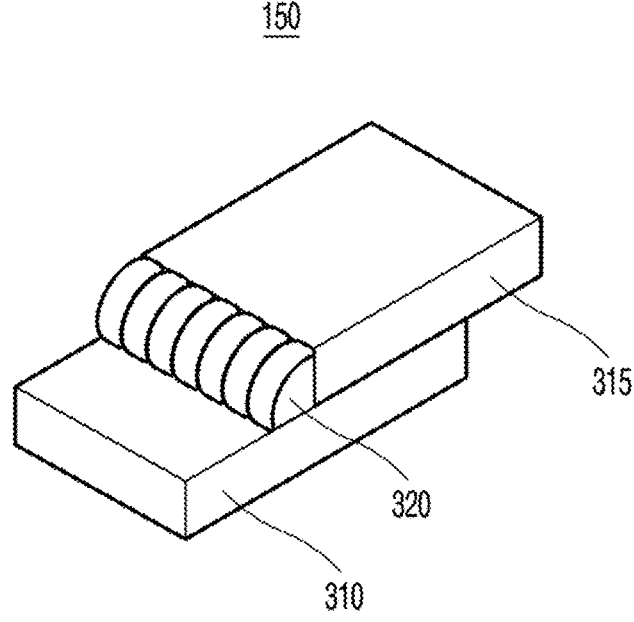
FIGS. 3A, 3B, 3C, and 3D are views illustrating examples of base materials according to the embodiment of the present disclosure.
Figure 3B:
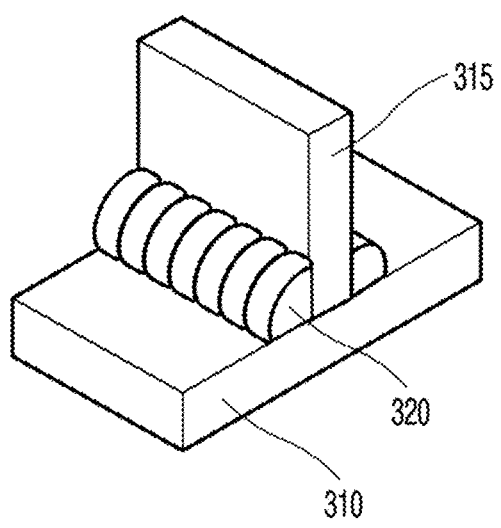

As illustrated in FIG. 3A or 3B, the evaluation target 150 may have a structure in which a base material 315 is stacked on a base material 310 so that the base material 315 overlaps the base material 310 by a predetermined area. As illustrated in FIG. 3A, the base material 315 may be stacked in the same direction as the base material 310. Alternatively, as illustrated in FIG. 3B, the base material 315 may be stacked in a direction perpendicular to the base material 310. Welding is performed on ends of the base material 310 and the base material 315 that are in contact with each other. Therefore, a welding bead 320 is formed when welding metal is welded in a space in which one surface of the base material 315 and one surface of the base material 310 are positioned to be perpendicular to each other (the ends of the base material 310 and the base material 315 that are in contact with each other).

Figure 3C:
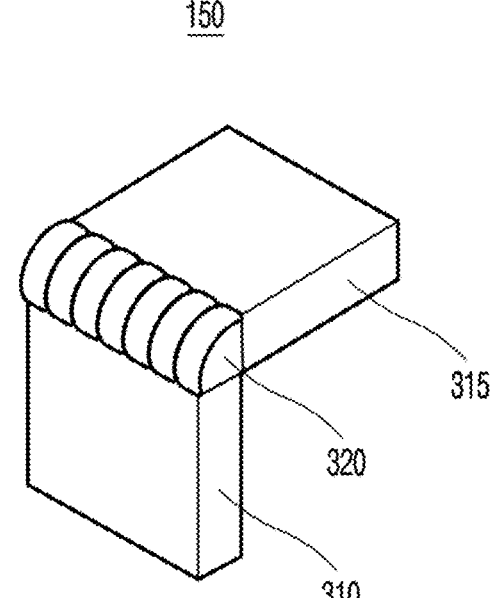

As illustrated in FIG. 3C, the evaluation target 150 may have a structure in which edges of the base material 310 and the base material 315 are perpendicularly in contact with each other. Therefore, the welding bead 320 is formed when welding metal is welded in a space in which the edges of the base material 310 and the base material 315 are in contact with each other.

Figure 3D:
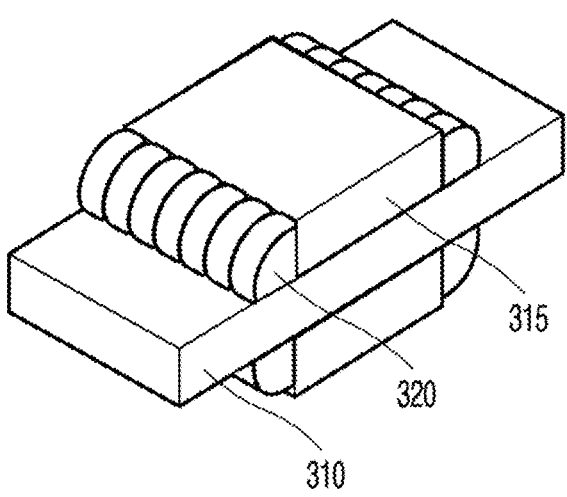

Alternatively, as illustrated in FIG. 3D, the evaluation target 150 may have a structure in which the base materials 315 are stacked on the base material 310 so that one surface of each of the base materials 315 entirely overlaps the base material 310. The welding bead 320 is formed at the position illustrated in FIG. 3A or 3B.

With reference back to FIG. 1, the evaluation system 100 may relatively accurately evaluate the welding condition of the evaluation target 150 having the structures described with reference to FIGS. 3A-3D.

The evaluation target 150 is supported on an upper surface of the stage 110, such that the scanner 120 may smoothly scan the evaluation target 150.

The scanner 120 senses three-dimensional images of the evaluation target 150 and transmits sensing values to the welding condition evaluation apparatus 130. The scanner 120 is implemented as a vision sensor or the like capable of performing three-dimensional image sensing and senses the three-dimensional image of the evaluation target 150 including the base materials 310 and 315 and the welding bead 320. The scanner 120 performs the sensing and then transmits the sensing value to the evaluation apparatus 130 so that the evaluation apparatus 130 may analyze a profile of the welding bead on the basis of the three-dimensional image of the evaluation target 150.

On the basis of the three-dimensional image of the evaluation target 150 sensed by the scanner 120, the evaluation apparatus 130 extracts only the welding bead and analyzes the profile of the welding bead. Further, on the basis of the result of analyzing the profile, the evaluation apparatus 130 may specifically identify the presence and position of a defective part in the welding bead and determine a degree of defect of the defective part.

Meanwhile, the evaluation apparatus 130 analyzes the quality of the welding bead on the basis of a voltage value/current value applied to a welding rod (not illustrated) during the welding process performed by a welder and a working angle/travel angle of the welding rod (not illustrated) implemented during the welding process performed by the welder collectively with or regardless of the profile of the welding bead. The evaluation apparatus 130 stores working angles/travel angles of the welding rods and voltage values/current values applied to the welding rod during the welding process performed by the welder with experiences at a preset reference level or higher. The evaluation apparatus 130 may evaluate the quality of the welding bead of the evaluation target by comparing the above-mentioned information on the welder with the stored information. A specific operation of the evaluation apparatus 130 will be described below with reference to FIG. 2.

The monitoring device 140 receives the three-dimensional image of the evaluation target 150, the extracted welding bead image, and the position and state of the defective part in the welding bead from the evaluation apparatus 130 and outputs the above-mentioned information. The monitoring device 140 outputs the above-mentioned images and enable the inspector to immediately identify the evaluation target 150, the welding bead 320, and a defective part in the welding bead during the evaluation process. The monitoring device 140 may output a defective part with a color different from colors of the other parts at the time of outputting the position and state of the defective part in the welding bead. In particular, the monitoring device 140 may output the defective part with different colors in accordance with causes of the defect.

Figure 2:
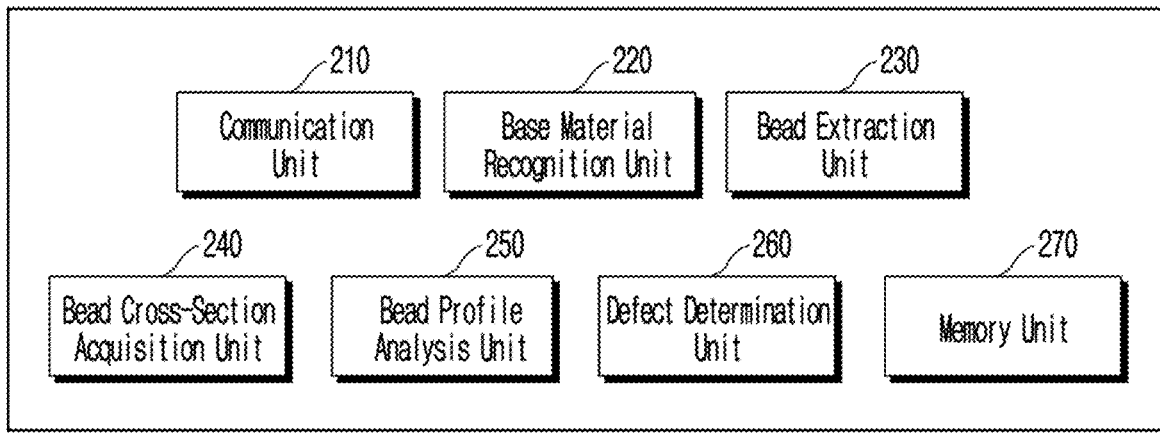
FIG. 2 is a view illustrating a configuration of a welding condition evaluation apparatus according to the embodiment of the present disclosure.
Figure 4:
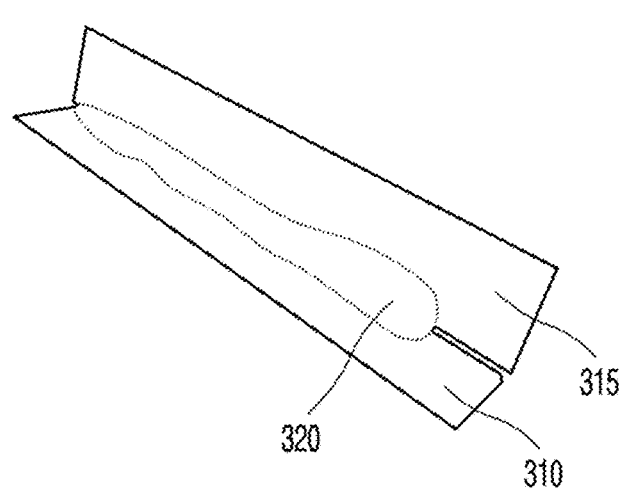
FIG. 4 is a view illustrating an example of three-dimensional data of base materials acquired by the welding condition evaluation apparatus according to the embodiment of the present disclosure.
Figure 5:
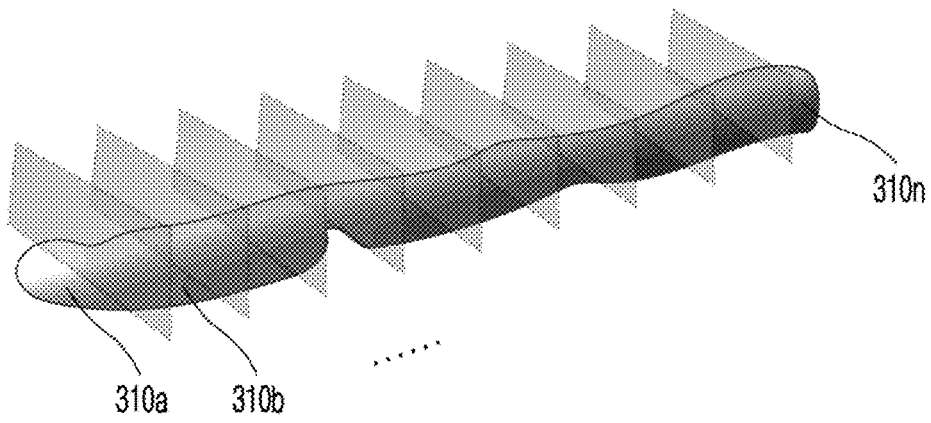
FIG. 5 is a view illustrating a process of acquiring cross-sectional shapes of three-dimensional data of base materials acquired by the welding condition evaluation apparatus according to the embodiment of the present disclosure.
Figure 6:
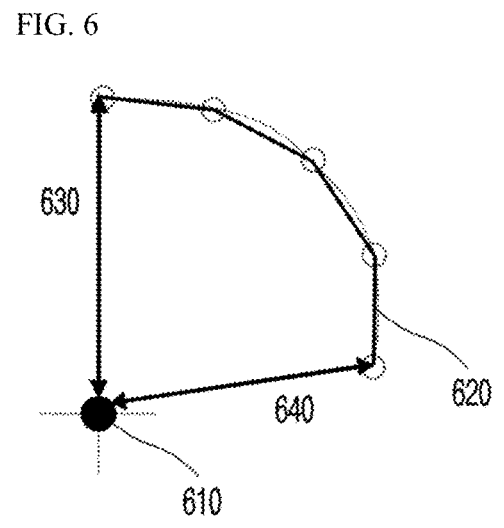

FIG. 2 is a view illustrating a configuration of a welding condition evaluation apparatus according to the embodiment of the present disclosure, FIG. 4 is a view illustrating an example of three-dimensional data of base materials acquired by the welding condition evaluation apparatus according to the embodiment of the present disclosure, FIG. 5 is a view illustrating a process of acquiring cross-sectional shapes of three-dimensional data of base materials acquired by the welding condition evaluation apparatus according to the embodiment of the present disclosure, and FIG. 6 is a view illustrating a process of analyzing a profile of a cross-sectional shape of a base material by using the welding condition evaluation apparatus according to the embodiment of the present disclosure.

With reference to FIG. 2, the evaluation apparatus 130 according to the embodiment of the present disclosure includes a communication unit 210, a base material recognition unit 220, a bead extraction unit 230, a bead cross-section acquisition unit 240, a bead profile analysis unit 250, and a defect determination unit 260. Further, the evaluation apparatus 130 may further include a memory unit 270.

The communication unit 210 receives a three-dimensional image of the evaluation target 150 from the scanner 120. In addition, the communication unit 210 transmits the three-dimensional image of the evaluation target 150, the welding bead image extracted by the bead extraction unit 230, and the cross-section image determined by the defect determination unit 260 to the monitoring device 140.

Meanwhile, the communication unit 210 receives the voltage value/current value applied to the welding rod (not illustrated) and the working angle/travel angle of the welding rod (not illustrated) implemented during the welding process performed by the welder from the welding rod (not illustrated), which is used by the welder to perform the welding process, or a welding device (not illustrated) including the welding rod (not illustrated).

Further, the communication unit 210 may receive a reference value, which is related to a criterion for determining the quality, from the outside (e.g., a terminal used by the inspector).

The base material recognition unit 220 recognizes the base material in the three-dimensional image of the evaluation target 150 by using a point cloud. Many points related to the components may be extracted from the three-dimensional image of the evaluation target 150. The base material recognition unit 220 acquires information on normal lines of the points from the points extracted from the three-dimensional image of the evaluation target 150. In order to acquire normal line information from any one point, the base material recognition unit 220 select two points adjacent to the corresponding point and derives a triangular plane defined by the points. In case that the triangular plane is derived from the three points, the base material recognition unit 220 acquires normal line information of the corresponding plane. The base material recognition unit 220 acquires normal line information from the points in the three-dimensional image of the evaluation target 150. The base material recognition unit 220 groups the points with the same normal line information by using the point cloud. The assembly of the points with normal line information in the same direction corresponds to the base material. Because the base materials are positioned so that the surfaces or edges thereof are perpendicular to each other, the base materials have information on different normal lines. With the above-mentioned configuration, the base material recognition unit 220 recognizes the base materials from normal line information of the points by using the point cloud. The base material recognition unit 220 may recognize the base material in the form of an equation of a plane at the time of recognizing the base material.

Meanwhile, in order to improve the accuracy in recognizing the base material, the base material recognition unit 220 may also recognize points, which are within a preset range from a boundary of the recognized base material, as the base material at the time of schematically recognizing the base material. Fine errors occur even though the scanner 120 acquires the three-dimensional image of the base material as accurately as possible. In consideration of these factors, the base material recognition unit 220 may also recognize the points, which are within a preset range from the boundary of the base material, e.g., within several millimeters (mm), as the adjacent base materials at the time of recognizing the base materials on the basis of the tendency of the normal line information.

The bead extraction unit 230 extracts the welding bead 320 welded between the base material 310 and the base material 315. As described above, the base material 310 and the base material 315 of the evaluation target 150 are positioned so that the surfaces or edges thereof are perpendicularly in contact with each other. With this structural feature, the welding bead 320 necessarily has a predetermined volume based on a straight line with which the two base materials 310 and 315 are in contact. In particular, the normal line information of each of the points in the welding bead 320 may be clearly distinguished from each of the points in the base materials 310 and 315. The bead extraction unit 230 may recognize a center and volume of the welding bead 320 and thus recognize a position of the welding bead 320.

The bead extraction unit 230 removes the points corresponding to the base material recognized by the base material recognition unit 220 in the three-dimensional image of the evaluation target 150, thereby extracting only the welding bead 320 at the above-mentioned position. The bead extraction unit 230 may accurately extract the welding bead 320 because the bead extraction unit 230 accurately recognizes the position of the welding bead 320 and the base material recognition unit 220 recognizes the base material or the area of the base material.

Specifically, with reference to FIG. 4, in case that the three-dimensional image of the evaluation target 150 is received, the base material recognition unit 220 recognizes the base materials 310 and 315 by using normal line information of the points in the three-dimensional image. Because the pieces of normal line information of the points included in the two base materials 310 and 315 are different from one another, the base material recognition unit 220 may easily recognize the two base materials 310 and 315. After the base material recognition unit 220 recognizes the base materials 310 and 315, the bead extraction unit 230 recognizes the position and volume of the welding bead 320 based on the straight line with which the two base materials 310 and 315 are in contact. The bead extraction unit 230 extracts only the welding bead 320 by removing the base materials 310 and 315 recognized by the base material recognition unit 220.

With reference back to FIG. 2, the bead cross-section acquisition unit 240 acquires cross-sections at preset intervals for the welding bead 320 extracted by the bead extraction unit 230. As illustrated in FIG. 5, the cross-sections correspond to cross-sections perpendicular to both the two base materials 310 and 315. The bead cross-section acquisition unit 240 acquires the cross-sections at the preset intervals in the corresponding direction of the welding bead 320. The preset interval may increase or decrease depending on a length of the welding bead 320 and the adjustable time.

With reference back to FIG. 2, the bead profile analysis unit 250 analyzes the profile of the welding bead on the basis of the cross-sections acquired by the bead cross-section acquisition unit 240. FIG. 6 illustrates the cross-section acquired by the bead cross-section acquisition unit 240.

With reference to FIG. 6, the bead profile analysis unit 250 creates an approximate curve 620 related to an outer periphery of the welding bead on the basis of the cross-section of the welding bead. The bead profile analysis unit 250 analyzes a height 630 and a width 640 of the welding bead 320 based on a center 610 with which the approximate curve 620 and the two base materials 310 and 315 are in contact. The bead profile analysis unit 250 derives the height 630 and the width 640 of the welding bead 320 and then analyzes the area of the welding bead 320. The welding bead 320 is implemented as a fan shape, a part of an ellipse, or an assembly of polygons. In view of these factors, the bead profile analysis unit 250 analyzes a cross-sectional area of the welding bead 320 by using the derived height 630 and width 640 of the welding bead 320. In case that a cross-sectional area is derived from a cross-section at a particular position, the bead profile analysis unit 250 may also analyze information on the volume and deviation of the entire welding bead 320 by using the intervals at which the bead cross-section acquisition unit 240 acquires the cross-sections and using the number of cross-sections. As described above, the bead profile analysis unit 250 may analyze the height, width, and area of the welding bead for the cross-section and analyze information on the volume and deviation of the entire welding bead 320.

In this case, the bead profile analysis unit 250 may analyze the profiles for all the cross-sections of the welding bead. However, the bead profile analysis unit 250 may set partial margins at two opposite ends of the welding bead (a start part of the welding and an end part of the welding) and analyze the profiles for the cross-sections from a section after the margin (based on a start point of the welding bead) to a section before the margin (based on an end point). As the welding process is performed, in a partial section after the start and in a partial section before the end, the operator's concentration tends to decrease and the quality tends to decrease in comparison with the other sections. As a result, the work reliability for the entire welding bead may deteriorate in case that the profile analysis is performed on all the cross-sections of the welding bead and the profiles of all the cross-sections are used to determine the work reliability for the entire welding bead. Because this may lead to somewhat incorrect results, the bead profile analysis unit 250 may analyze the profiles of the cross-sections of the welding bead only from the section after the margin to the section before the margin with the margins, by a preset section, at the two opposite ends of the welding bead.

With reference back to FIG. 2, the defect determination unit 260 determines a defective part in the welding bead 320.

The defect determination unit 260 may autonomously determine the defective part in the welding bead 320. The profiles for the cross-sections acquired at the preset intervals are derived by the bead cross-section acquisition unit 240 and the bead profile analysis unit 250. The defect determination unit 260 calculates an average value of the profiles of the cross-sections of the welding bead 320. The defect determination unit 260 may determine whether there is a cross-section having a profile deviating from the calculated average value in a preset error range (e.g., several to several tens of %), and the defect determination unit 260 may determine that the corresponding cross-section and a part adjacent to the corresponding cross-section (e.g., a position between the corresponding cross-section and a cross-section adjacent to the corresponding cross-section) are defective parts. For example, in case that an area of a particular cross-section deviates from the preset error range based on the area average of the cross-sections of the entire welding bead, the defect determination unit 260 may determine that the corresponding cross-section and the part adjacent to the corresponding cross-section are defective.

As described above, the defect determination unit 260 may determine whether the cross-sections are defective, and the defect determination unit 260 may numerically calculate the work reliability of the entire welding bead on the basis of the frequency of the normal bead cross-sections or the frequency of the defective bead cross-sections. For example, in case that no defective bead cross-section is detected for the entire welding bead, the defect determination unit may calculate that the work reliability for the entire welding bead is 100%. The reliability may gradually decrease as the number of defective bead cross-sections increases.

As another example, the defect determination unit 260 may determine a defective part in the welding bead 320 on the basis of the reference value related to the criterion for determining the quality, and the communication unit 210 may receive the reference value from the outside. The defect determination unit 260 compares the profiles of the cross-sections of the welding bead 320 with the reference value received from the outside and used to determine the quality of the profile, and the defect determination unit 260 determines whether there is a cross-section having a profile deviating from the reference value. The defect determination unit 260 determines that the cross-section having the profile deviating from the reference value is the defective part.

As still another example, the defect determination unit 260 may determine the quality of the welding bead 320 by comparing the profile with an overall profile of a reference welding bead stored in the memory unit 270. The defect determination unit 260 calculates the overall profile of the welding bead 320 by calculating an average of the profiles of the cross-sections of the welding bead 320. Meanwhile, as described below, the memory unit 270 stores the overall profile of the reference welding bead when the welder with the experience at a preset reference level or higher performs the welding process without abnormality. The memory unit 270 stores overall profiles of the reference welding beads variously created by the welder in a state in which the base materials are variously disposed. The defect determination unit 260 compares the overall profile of the welding bead 320 and the overall profile of the reference welding bead obtained in the same situation as the welding bead 320. The defect determination unit 260 obtains deviations by comparing the components (information on widths, heights, areas, and deviations) included in the overall profile. An increase in deviation between the two overall profiles means a decrease in quality of the welding bead 320. As described above, the defect determination unit 260 analyzes the quality of the welding bead 320 by comparing the overall profile of the welding bead 320 and the overall profile of the reference welding bead stored in the memory unit 270.

In particular, the defect determination unit 260 may perform machine learning by using the information stored in the memory unit 270. The defect determination unit 260 may perform the machine learning to output the overall profile of the welding bead 320 as an input value and to output the quality of the welding bead 320 as an output value. Therefore, the defect determination unit 260 may analyze the quality of the welding bead 320 by receiving the overall profile of the welding bead 320.

Meanwhile, regardless of the above-mentioned process, the defect determination unit 260 may determine the quality of the welding bead 320 by comparing the voltage value/current value applied to the welding rod (not illustrated) (received by the communication unit 210) and the working angle/travel angle of the welding rod (not illustrated) implemented during the welding process performed by the welder with the information stored in the memory unit 270. The memory unit 270 stores the voltage value/current value applied to the welding rod (not illustrated) and the working angle/travel angle of the welding rod (not illustrated) when the welder with the experience at a preset reference level or higher performs the welding process without abnormality. The memory unit 270 stores pieces of information when the welding process is variously performed by the welder in the state in which the base materials are variously disposed. The defect determination unit 260 compares the information, which is received by the communication unit 210 from the welding rod (not illustrated) or the welding device (not illustrated), with the information stored in the memory unit 270. The defect determination unit 260 obtains deviations by comparing the pieces of information. Likewise, the increase in deviation between the two overall profiles means the decrease in quality of the welding bead 320. The defect determination unit 260 analyzes the quality of the welding bead 320 by comparing the two overall profiles. The defect determination unit 260 may analyze the quality of the welding bead 320 in consideration of both the result of comparing the profiles and the result of comparing the pieces of information. Alternatively, the defect determination unit 260 may analyze the quality of the welding bead 320 in consideration of each of the result of comparing the profiles and the result of comparing the pieces of information.

The memory unit 270 stores the overall profile of the reference welding bead when the welder with the experience at a preset reference level or higher performs the welding process without abnormality, or the memory unit 270 stores the voltage value/current value applied to the welding rod (not illustrated) and the working angle/travel angle of the welding rod (not illustrated). The memory unit 270 stores all the pieces of information when the welding process is variously performed by the welder in the state in which the base materials are variously disposed.

In case that there is a cross-section determined as being defective among the cross-sections separated at preset intervals according to the above-mentioned example, the defect determination unit 260 may express the defective cross-section with a separate color or the like so that the defective cross-section is distinguished from the normal bead cross-section. Therefore, the inspector may more easily recognize the defective cross-section.

The evaluation apparatus 130 including the above-mentioned components may accurately evaluate the quality of the welding bead 320 in the evaluation target 150 (including the welding bead welded between the base materials configured such that the surfaces or edges thereof are perpendicularly in contact with each other).

Figure 7:
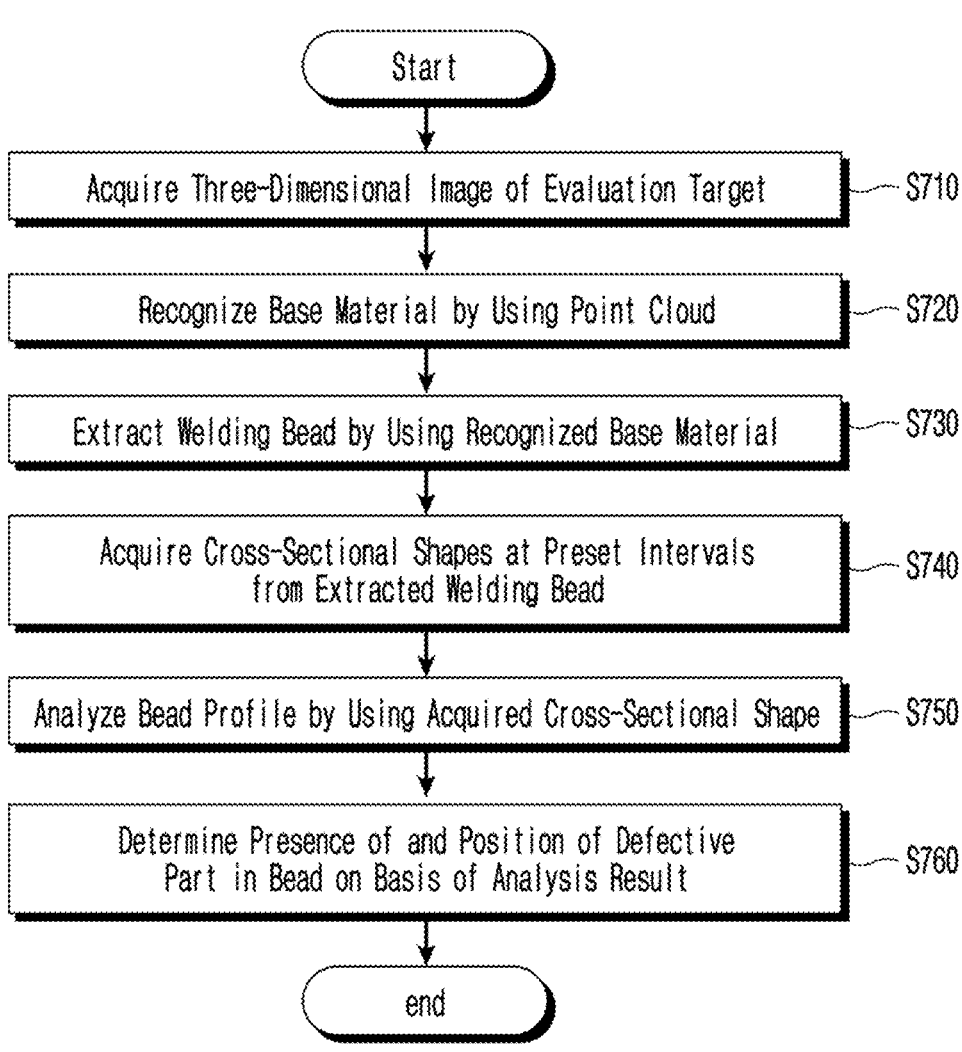
FIG. 7 is a flowchart illustrating a method of evaluating a welding condition of a base material by using the welding condition evaluation apparatus according to the embodiment of the present disclosure.

FIG. 7 is a flowchart illustrating a method of evaluating a welding condition of a base material by using the welding condition evaluation apparatus according to the embodiment of the present disclosure.

The communication unit 210 acquires a three-dimensional image of an evaluation target from the scanner 120 (S710).

The base material recognition unit 220 recognizes a base material by using the point cloud (S720).

The bead extraction unit 230 extracts a welding bead by using the base material recognized in the three-dimensional image (S730).

The bead cross-section acquisition unit 240 acquires cross-sectional shapes at preset intervals from the extracted welding bead (S740).

The bead profile analysis unit 250 analyzes a bead profile by using the acquired cross-sectional shape (S750).

The defect determination unit 260 determines the presence of and position of a defective part in the bead on the basis of the analysis result (S760).

FIG. 7 illustrates that the processes are sequentially performed, but this illustration is given to exemplarily describe the technical spirit of the embodiment of the present disclosure. In other words, those skilled in the art to which the embodiment of the present disclosure pertains may apply various alterations and modifications by executing the processes in a different order from that illustrated in each of the drawings or executing one or more of the processes in parallel without departing from the intrinsic characteristics of the embodiment of the present disclosure. Therefore, FIG. 7 is not intended to be limited to the sequences set in a time series manner.

Meanwhile, the processes illustrated in FIG. 7 may be implemented as computer-readable codes stored in computer-readable recording media. The computer-readable recording media include all kinds of storage devices for storing data readable by a computer system. That is, the computer-readable recording media include storage media such as magnetic storage media (e.g., ROMs, floppy discs, hard discs, etc.) and optical readout media (e.g., CD-ROMs, DVDs, etc.). In addition, the computer-readable recording media may be distributed to computer systems connected over networks and store and execute computer-readable codes in a distributed manner.

The above description is simply given for illustratively describing the technical spirit of the present embodiment, and those skilled in the art to which the present embodiment pertains will appreciate that various changes and modifications are possible without departing from the essential characteristic of the present embodiment. Therefore, the embodiments are provided for illustrative purposes only but not intended to limit the technical concept of the present embodiment. The scope of the technical concept of the present embodiment is not limited thereto. The protective scope of the present embodiment should be construed based on the following claims, and all the technical spirit in the equivalent scope thereto should be construed as falling within the scope of the present embodiment.

What is claimed is:

1. A welding condition evaluation apparatus comprising:
a communication unit configured to receive a three-dimensional image for an evaluation target;
a base material recognition unit configured to recognize a base material and another base material from the three-dimensional image for the evaluation target by using a point cloud;
a bead extraction unit configured to extract a welding bead welded between the base material and the another base material;
a bead cross-section acquisition unit configured to acquire cross-sections at preset intervals for the extracted welding bead; and
a profile analysis unit configured to analyze a profile of the welding bead for the cross-sections acquired by the bead cross-section acquisition unit,
wherein the evaluation target has a structure in which the another base material is stacked on the base material such that the base material overlaps the another base material, and welding is performed on ends of the base material and the another base material that are in contact with each other, or a structure in which the base material and the another base material contact each other edge-to-edge in a perpendicular manner, and welding is performed in a space formed where edges of the base material and the another base material are in contact with each other,
the base material recognition unit is configured to select two other points adjacent to each extracted point from the three-dimensional image of the evaluation target to derive a triangular plane formed by the extracted points and the two other points, acquire normal vector information from the plane, and recognize the base material and the another base material by grouping points having identical normal vector information, and
the bead extraction unit is configured to extract the welding bead that has a preset volume based on a straight line with which the base material and another base material are in contact.

2. The welding condition evaluation apparatus of claim 1, wherein the bead extraction unit extracts only the welding bead by removing the base material recognized by the base material recognition unit from the three-dimensional image for the evaluation target.

3. The welding condition evaluation apparatus of claim 1, further comprising:
a defect determination unit configured to determine a defective part in the welding bead on the basis of the profile analyzed by the profile analysis unit.

4. The welding condition evaluation apparatus of claim 3, wherein the defect determination unit calculates an average value of the profiles of the cross-sections of the welding bead.

5. The welding condition evaluation apparatus of claim 4, wherein the defect determination unit determines whether there is a cross-section having a profile deviating from the calculated average value in a preset error range.

6. The welding condition evaluation apparatus of claim 5, wherein the defect determination unit determines that a section to the cross-section having the profile deviating from the calculated average value in the preset error range and a cross-section adjacent to the corresponding cross-section is a defective part.

7. A welding condition evaluation system, which three-dimensionally measures an evaluation target, which has been welded, and evaluates a welding condition of a welding bead by extracting only the welding bead in measured data, the welding condition evaluation system comprising:
a stage configured to support the evaluation target on an upper surface thereof;
a scanner configured to sense a three-dimensional image of the evaluation target; and
a welding condition evaluation apparatus configured to analyze a profile of the welding bead by extracting only the welding bead on the basis of the three-dimensional image of the evaluation target sensed by the scanner,
wherein the welding condition evaluation apparatus comprises:
a communication unit configured to receive a three-dimensional image for an evaluation target;
a base material recognition unit configured to recognize a base material and another base material from the three-dimensional image for the evaluation target by using a point cloud;
a bead extraction unit configured to extract a welding bead welded between the base material and the another base material;
a bead cross-section acquisition unit configured to acquire cross-sections at preset intervals for the extracted welding bead; and
a profile analysis unit configured to analyze a profile of the welding bead for the cross-sections acquired by the bead cross-section acquisition unit,
wherein the evaluation target has a structure in which the another base material is stacked on the base material such that the base material overlaps the another base material, and welding is performed on ends of the base material and the another base material that are in contact with each other, or a structure in which the base material and the another base material contact each other edge-to-edge in a perpendicular manner, and welding is performed in a space formed where edges of the base material and the another base material are in contact with each other,
the base material recognition unit is configured to select two other points adjacent to each extracted point from the three-dimensional image of the evaluation target to derive a triangular plane formed by the extracted points and the two other points, acquire normal vector information from the plane, and recognize the base material and the another base material by grouping points having identical normal vector information, and
the bead extraction unit is configured to extract the welding bead that has a preset volume based on a straight line with which the base material and another base material are in contact.

8. A method of evaluating a welding condition of an evaluation target by using a welding condition evaluation apparatus, the method comprising:

a receiving process of receiving a three-dimensional image for an evaluation target;

a recognition process of recognizing a base material and another base material from the three-dimensional image for the evaluation target by using a point cloud;

an extraction process of extracting a welding bead welded between the base material and the another base material;

an acquisition process of acquiring cross-sections at preset intervals for the welding bead extracted in the extraction process; and an analysis process of analyzing a profile of the welding bead for the cross-sections acquired in the acquisition process, wherein the evaluation target has a structure in which the another base material is stacked on the base material such that the base material overlaps the another base material, and welding is performed on ends of the base material and the another base material that are in contact with each other, or a structure in which the base material and the another base material contact each other edge-to-edge in a perpendicular manner, and welding is performed in a space formed where edges of the base material and the another base material are in contact with each other, the recognition process comprises selecting two other points adjacent to each extracted point from the three-dimensional image of the evaluation target to derive a triangular plane formed by the extracted points and the two other points, acquiring normal vector information from the plane, and recognizing the base material and the another base material by grouping points having identical normal vector information, and the extraction processing comprises extracting the welding bead that has a preset volume based on a straight line with which the base material and another base material are in contact.

9. The method of claim 8, further comprising:

a determination process of determining presence of and position of a defective part in the welding bead on the basis of an analysis result made in the analysis process.

* * * * *